(12) United States Patent
Wang et al.

(10) Patent No.: US 10,679,426 B2
(45) Date of Patent: Jun. 9, 2020

(54) METHOD AND APPARATUS FOR PROCESSING DISPLAY DATA

(71) Applicant: CLOUDMINDS (SHENZHEN) ROBOTICS SYSTEMS CO., LTD., Shenzhen (CN)

(72) Inventors: Kai Wang, Beijing (CN); Shiguo Lian, Beijing (CN)

(73) Assignee: CLOUDMINDS (SHENZHEN) ROBOTICS SYSTEMS CO., LTD., Shenzhen (CN)

(*) Notice: Subject to any disclaimer, the term of this patent is extended or adjusted under 35 U.S.C. 154(b) by 0 days.

(21) Appl. No.: 16/453,445

(22) Filed: Jun. 26, 2019

(65) Prior Publication Data

US 2019/0318546 A1    Oct. 17, 2019

Related U.S. Application Data

(63) Continuation of application No. PCT/CN2016/112722, filed on Dec. 28, 2016.

(51) Int. Cl.
G06T 19/00 (2011.01)
G06T 15/20 (2011.01)
G06T 15/04 (2011.01)

(52) U.S. Cl.
CPC .......... *G06T 19/006* (2013.01); *G06T 15/04* (2013.01); *G06T 15/20* (2013.01)

(58) Field of Classification Search
CPC .. G06K 9/00664–00704; G06F 3/0481; G06F 3/04817; G06F 9/4443;
(Continued)

(56) References Cited

U.S. PATENT DOCUMENTS 6,081,275 A * 6/2000 Kojima .................. G06T 15/04
                                                345/427
7,539,606 B2 * 5/2009 Comair .................. G06T 13/60
                                                345/419
(Continued)

FOREIGN PATENT DOCUMENTS

CN         101241603 A       8/2008
CN         101309471 A       11/2008
(Continued)

OTHER PUBLICATIONS

International Search Report and Written Opinion from counterpart International Patent Application No. PCT/CN2016/112722, dated Sep. 28, 2017.
(Continued)

*Primary Examiner* — Todd Buttram
(74) *Attorney, Agent, or Firm* — Tucker Ellis LLP

(57) ABSTRACT

The embodiment of the present invention discloses a method and an apparatus for processing display data. The method includes: obtaining user data of a user render request according to the received user render request, wherein the user data include: a scene picture and an augmented reality picture; setting layer information of a virtual camera that performs image render on the scene picture and the augmented reality picture in a render process, and layer information of the scene picture and the augmented reality picture in the render process, wherein the virtual camera and the scene picture and the augmented reality picture rendered by the virtual camera correspond to the same layer information in the render process; and rendering the scene picture and the augmented reality picture by the virtual camera corresponding to layer information in the render process according to different layer information.

7 Claims, 6 Drawing Sheets

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10

See application file for complete search history.

(56) References Cited

U.S. PATENT DOCUMENTS

| | | | |
|---|---|---|---|
| 9,959,905 B1* | 5/2018 | Sevigny | H04N 5/23238 |
| 2006/0028489 A1* | 2/2006 | Uyttendaele | G06T 15/205 |
| | | | 345/646 |
| 2011/0128286 A1 | 6/2011 | Park | |
| 2012/0327196 A1* | 12/2012 | Ohba | G06K 9/00281 |
| | | | 348/49 |
| 2013/0286010 A1 | 10/2013 | Yan | |
| 2013/0300767 A1* | 11/2013 | Kochi | G06T 19/006 |
| | | | 345/633 |
| 2013/0314421 A1* | 11/2013 | Kim | G09B 5/065 |
| | | | 345/427 |
| 2015/0371436 A1* | 12/2015 | Sachter-Zeltzer | G06T 15/60 |
| | | | 345/426 |
| 2017/0225077 A1* | 8/2017 | Kim | A63F 13/525 |
| 2017/0280133 A1* | 9/2017 | Niemela | H04N 13/156 |

FOREIGN PATENT DOCUMENTS

| | | |
|---|---|---|
| CN | 102568026 A | 7/2012 |
| CN | 103049924 A | 4/2013 |
| CN | 103294453 A | 9/2013 |
| CN | 103339658 A | 10/2013 |
| CN | 103617645 A | 3/2014 |
| CN | 104317586 A | 1/2015 |
| CN | 106131536 A | 11/2016 |
| WO | 0135675 A1 | 5/2001 |

OTHER PUBLICATIONS

Office Action from corresponding Chinese Patent Application No. 201680006898.0, dated Mar. 18, 2020, 15 pages including English translation.

\* cited by examiner

METHOD AND APPARATUS FOR PROCESSING DISPLAY DATA

CROSS-REFERENCE TO RELATED APPLICATION

The present application is a continuation application under 35 U.S.C. § 120 of PCT Application No. PCT/CN2016/112722 filed on Dec. 28, 2016, the contents of which are incorporated herein by reference.

FIELD OF THE INVENTION

Embodiments of the present invention relate to the field of image processing technology, and in particular, to a method and an apparatus for processing display data.

BACKGROUND OF THE INVENTION

The render of augmented reality (referred to as AR) pictures refers to an image processing process of superimposing augmented reality pictures (such as 3D models, animations, characters and the like) on a scene picture (for example, 2D video pictures) and synthesizing a new picture.

The existing render modes of augmented reality pictures may be divided into two types: local render and cloud render. The local render is to perform scene picture collection and the superimposing of the augmented reality pictures locally, and is suitable for a single render application in which the scene pictures and the superposed augmented reality pictures are simpler and the requirements for calculated amount; and the cloud render is to execute a render task on a cloud server with strong computing power and may be applied to solutions with relatively complicated scene pictures and the superposed augmented reality pictures, and in additions, the render requirements of multiple users may be processed simultaneously.

The picture render method provided in the prior art is mainly for scenes such as a movie special effect and the like, and the render is mostly performed offline, and a separate render process is set for different render tasks, so that a large number of system resources are occupied when too many render processes are started.

SUMMARY OF THE INVENTION

Embodiments of the present invention provide a method and an apparatus for processing display data capable of processing multiple render tasks in the same render process, thereby saving system resources.

In a first aspect, a method for processing display data is provided, including:

obtaining user data of a user render request according to the received user render request, wherein the user data include: a scene picture and an augmented reality picture;

setting layer information of a virtual camera that performs image render on the scene picture and the augmented reality picture in a render process, and layer information of the scene picture and the augmented reality picture in the render process, wherein the virtual camera and the scene picture and the augmented reality picture rendered by the virtual camera correspond to the same layer information in the render process; and rendering the scene picture and the augmented reality picture by the virtual camera corresponding to the layer information in the render process according to the layer information.

In a second aspect, an apparatus for processing display data is provided, including:

an obtaining unit, configured to obtain user data of a user render request according to the received user render request, wherein the user data include: a scene picture and an augmented reality picture;

a processing unit, configured to set layer information of a virtual camera that performs image render on the scene picture and the augmented reality picture in a render process, and layer information of the scene picture and the augmented reality picture in the render process, wherein the virtual camera and the scene picture and the augmented reality picture rendered by the virtual camera correspond to the same layer information in the render process; and the processing unit is further configured to render the scene picture and the augmented reality picture by the virtual camera corresponding to the layer information in the render process according to the layer information.

In a third aspect, an apparatus for processing display data is provided, including: a memory, a communication interface and a processor, wherein the memory and the communication interface are coupled to the processor; and the memory is configured to store a computer execution code, the processor is configured to execute the computer execution code to control the execution of any one of the above methods for processing display data, and the communication interface is configured to perform data transmission between the apparatus for processing display data and an external device.

In a fourth aspect, a computer storage medium is provided for storing a computer software instruction used by the apparatus for processing display data, and including a program code designed for any one of the above methods for processing display data.

In a fifth aspect, a computer program product is provided, which is capable of being directly loaded in an internal memory of a computer and contains a software code, and the computer program may implement any one of the above methods for processing display data after being loaded and executed by the computer.

In the above solution, the apparatus for processing display data is capable of obtaining the user data of the user render request according to the received user render request, wherein the user data include the scene picture and the augmented reality picture; setting the layer information of the virtual camera that performs image render on the scene picture and the augmented reality picture in the render process, and the layer information of the scene picture and the augmented reality picture in the render process, wherein the virtual camera, the scene picture and the augmented reality picture correspond to the same layer information in the render process; and rendering the scene picture and the augmented reality picture by the virtual camera corresponding to the layer information in the render process according to the layer information. In this way, by means of the processing of the above solution, with respect to the render task requested by the user render request for processing, since the same layer information is set for the virtual camera, the scene picture and the augmented reality picture in the render process, a corresponding layer may be set in the render process to perform the render during the render; and for different render tasks, different layers may be set in the render process to perform the render, therefore multiple render tasks may be processed in the same render process, and the system resources are saved accordingly.

BRIEF DESCRIPTION OF THE DRAWINGS

To illustrate technical solutions in the embodiments of the present invention more clearly, a brief introduction on the drawings which are needed in the description of the embodiments or the prior art is given below. Apparently, the drawings in the description below are merely some of the embodiments of the present invention, based on which other drawings may be obtained by those of ordinary skill in the art without any creative effort.

DETAILED DESCRIPTION OF THE EMBODIMENTS

Figure 1:
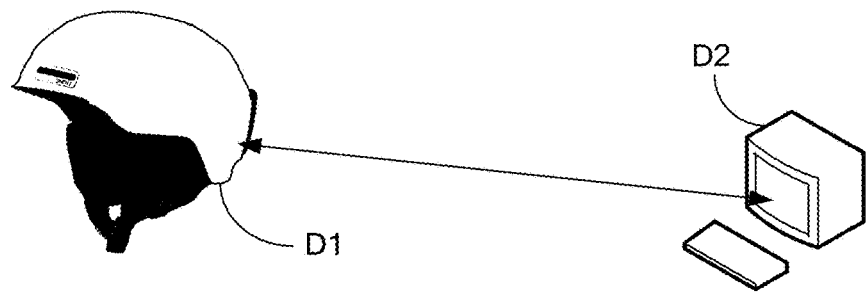
FIG. 1 is a structure diagram of a display system provided by an embodiment of the present invention.

A system architecture and a service scene described in the embodiment of the present invention are for the purpose of more clearly illustrating the technical solutions of the embodiment of the present invention, and do not constitute a limitation of the technical solutions provided by the embodiment of the present invention. Those of ordinary skill in the art may know that the technical solutions provided by the embodiment of the present invention are also applicable to similar technical problems with the evolution of the system architecture and the appearance of new service scenes.

It should be noted that, in the embodiment of the present invention, the words "exemplary" or "for example" or the like are used for meaning examples, example illustration or illustration. Any embodiment or design solution described as "exemplary" or "for example" in the embodiment of the present invention should not be construed as be more preferred or advantageous than other embodiments or design solutions. Properly speaking, the words "exemplary" or "for example" or the like are intended to present related concepts in a specific manner.

It should be noted that, in the embodiment of the present invention, "of", "corresponding", "relevant" and "corresponding" may sometimes be mixed for use. It should be noted that, when the difference is not emphasized, the meanings to be expressed are the same.

A client provided by the embodiment of the present invention may be a personal computer (abbreviation: PC), a netbook, a personal digital assistant (referred to as PDA) or the like, or, the above client may be a PC and the like, which is installed with a software client or a software system or a software application that is capable of executing the method provided by the embodiment of the present invention, a specific hardware implementation environment may be a general computer form, or an ASIC way, or an FPGA, or some programmable expansion platforms such as Xtensa platform of Tensilica and the like. A server provided by the embodiment of the present invention includes a local domain name server, a local proxy server and a network server. The embodiment of the present invention provides the server for providing a computing service in response to a service request. The basic components include a processor, a hard disk, a memory, a system bus and the like, which is similar to the general computer architecture.

The basic principle of the present invention is as follows: with respect to a render task requested by a user render request for processing, the same layer information is set for a virtual camera, a scene picture and an augmented reality picture in a render process, a corresponding layer may be set in the render process to perform the render during the render; and for different render tasks, different layers may be set in the render process to perform the render, therefore multiple render tasks may be processed in the same render process, and accordingly the system resources are saved.

Referring to FIG. 1, the solution provided by the embodiment of the present invention is applicable to the following display system, and the system includes an apparatus for display data provided by the embodiment of the present invention.

The implementation form includes the following two architectures: the architecture 1 includes a front end device D1 and a client D2 connected with the front end device D1, wherein the client D2 is the apparatus for processing display data provided by the embodiment of the present invention or includes the apparatus for processing display data provided by the embodiment of the present invention; and when the scene picture collected by the front end device D1 is relatively simple, and the augmented reality picture to be superposed with the scene picture is relatively simple, the method for processing display data provided by the embodiment of the present invention may be directly executed under the computing resources of the client D2, and rendered data are displayed by a display device of the client D2.

Figure 2:
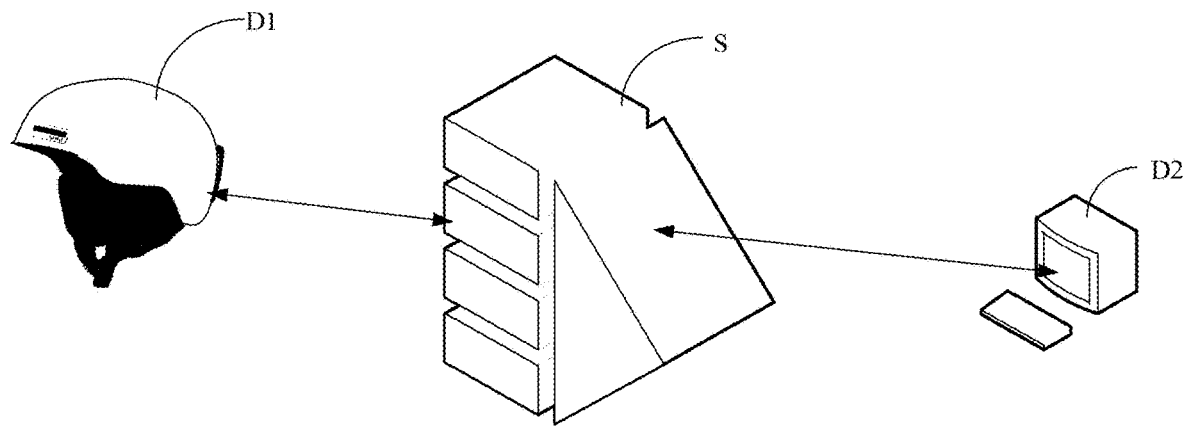
FIG. 2 is a structure diagram of a display system provided by an embodiment of the present invention.

Of course, the client D2 may only perform data collection and does not have a function of data processing, so that only few computing resources may be configured to the client D2 to reduce the cost, so that the embodiment of the present invention provides another system architecture. Referring to FIG. 2, the architecture 2 includes a front end device D1, a server S and a client D2, the front end device D1 and the client D2 are connected with the server S, in this way, the server S is the apparatus for processing display data provided by the embodiment of the present invention or includes the apparatus for processing display data provided by the embodiment of the present invention. In this case, even if the scene picture collected by the front end device D1 is relatively complicated, and/or, the augmented reality picture to be superimposed with the scene picture is relatively complicated, the server S may provide the sufficient computing resources to implement the method for processing display data provided by the embodiment of the present invention, therefore, the front end device D1 sends the scene picture to the server S after collecting the same, the server S executes the method for processing display data provided by the embodiment of the present invention, and sends the rendered data to the display device of the client D2 for display. The front end device may be a portable terminal device, such as a wearable helmet, a headset; a mobile device such as a mobile phone, a tablet computer or the like. That is, the embodiment of the present invention may be executed by the server and may also be separately executed by the client. A sensor carried by the front end device may include devices capable of collecting the scene picture, such as an image sensor, a sound sensor, an ultrasonic radar sensor, etc.

Figure 3:
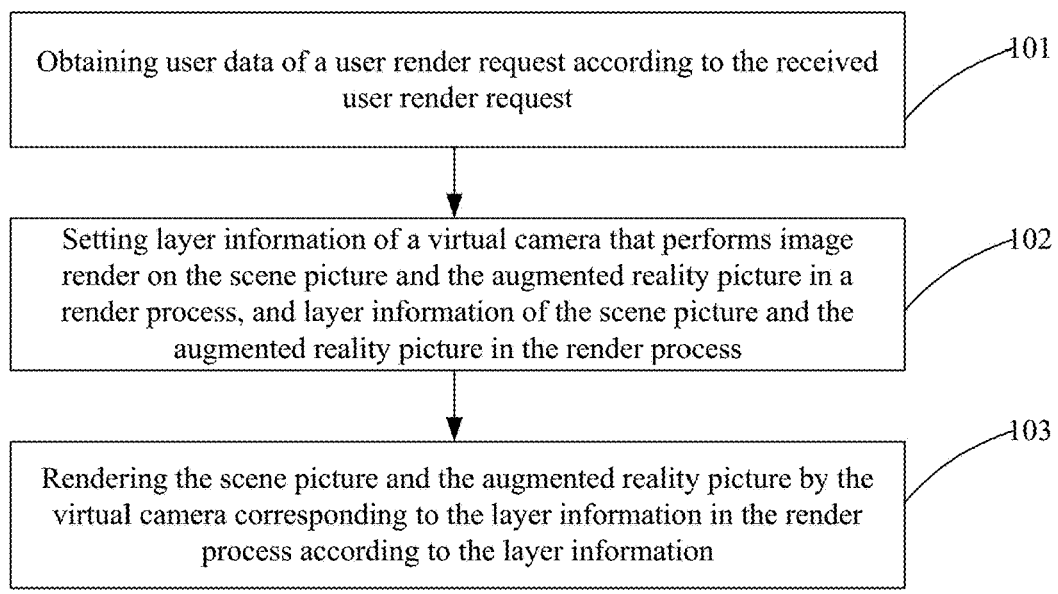
FIG. 3 is a flowchart of a method for processing display data provided by an embodiment of the present invention.

Based on the above system, referring to FIG. 3, the embodiment of the present invention provides a method for processing display data, including the following steps:

101. Obtaining user data of a user render request according to the received user render request, wherein the user data include: a scene picture and an augmented reality picture.

Specifically, an apparatus for processing display data obtains the user data of the user render request after receiving the user render request, exemplarily, the user data include the scene picture and the augmented reality picture, and the user data may be carried in the user render request, or, the apparatus for processing display data downloads the user data in a corresponding server after receiving the user render request, wherein the scene image may be collected by a front end device carrying a collection apparatus in the environment where the user is located in real time or is pre-stored in the client or a cloud server after being collected offline. The augmented reality picture may be automatically generated by the client or the cloud server after analyzing a predetermined target in the scene picture or is actively configured by the user for the predetermined target in the scene picture according to the scene picture, exemplarily, for the scene picture collected by the front end device, the augmented reality picture is configured in a traffic facility or an obstacle in the scene picture.

102. Setting layer information of a virtual camera that performs image render on the scene picture and the augmented reality picture in a render process, and layer information of the scene picture and the augmented reality picture in the render process.

The virtual camera and the scene picture and the augmented reality picture rendered by the virtual camera correspond to the same layer information in the render process, wherein the layer information may be identified by a number or a character string.

103. Rendering the scene picture and the augmented reality picture by the virtual camera corresponding to the layer information in the render process according to the layer information.

Figure 4:
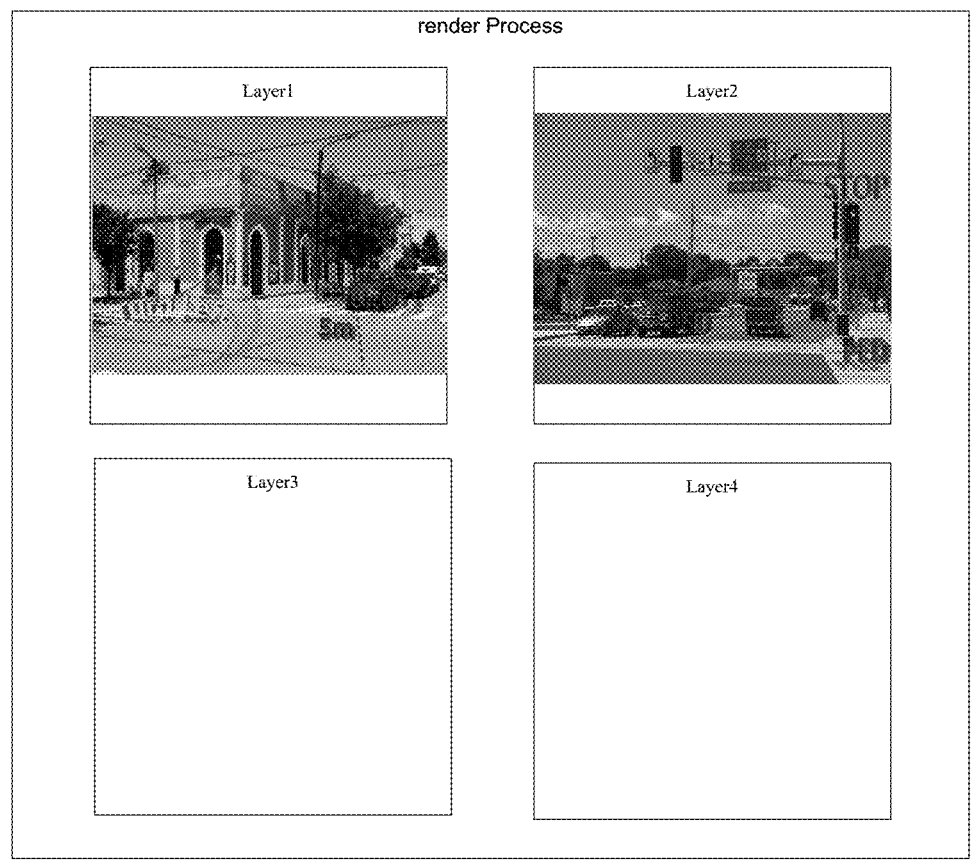
FIG. 4 is a schematic diagram of a render process in a method for processing display data provided by an embodiment of the present invention.

The steps 102 and 103 are exemplified as follows, as shown in FIG. 4, for the first user render request, a first virtual camera corresponding to a layer 1 and the scene picture and the augmented reality picture in the user data requested by the first user render request are configured in the render process, in this way, the scene picture and the augmented reality picture rendered by the first virtual camera are only performed in the layer 1 in the render process; for another user render request (second user render request), a second virtual camera corresponding to a layer 2 and the scene picture and the augmented reality picture in the user data requested by the second user render request are configured in the render process, in this way, the scene picture and the augmented reality picture rendered by the second virtual camera are only rendered in the layer 2 in the render process, thereby implementing render tasks initiated by the two user render requests in the same render process, wherein in FIG. 4, an environment serving as the background in the layer 1 is an example of the scene picture; and Turn Left, 5 m, Danger! are used as examples of the augmented reality picture. The environment serving as the background in the Layer 2 is the example of the scene picture; and STOP and PED are the examples of the augmented reality picture. Of course, according to the actual situation, the process may also include Layer 3, Layer 4 . . .

In the above solution, the apparatus for processing display data is capable of obtaining the user data of the user render request according to the received user render request, wherein the user data include the scene picture and the augmented reality picture; setting the layer information of the virtual camera that performs image render on the scene picture and the augmented reality picture in the render process, and the layer information of the scene picture and the augmented reality picture in the render process, wherein the virtual camera, the scene picture and the augmented reality picture correspond to the same layer information in the render process; and rendering the scene picture and the augmented reality picture by the virtual camera corresponding to the layer information in the render process according to the layer information. In this way, by means of the processing of the above solution, with respect to the render task requested by the user render request for processing, since the same layer information is set for the virtual camera, the scene picture and the augmented reality picture in the render process, a corresponding layer may be set in the render process to perform the render during the render; and for different render tasks, different layers may be set in the render process to perform the render, therefore the render tasks requested by multiple user render requests for processing may be processed in the same render process, and accordingly the system resources are saved.

Figure 5:
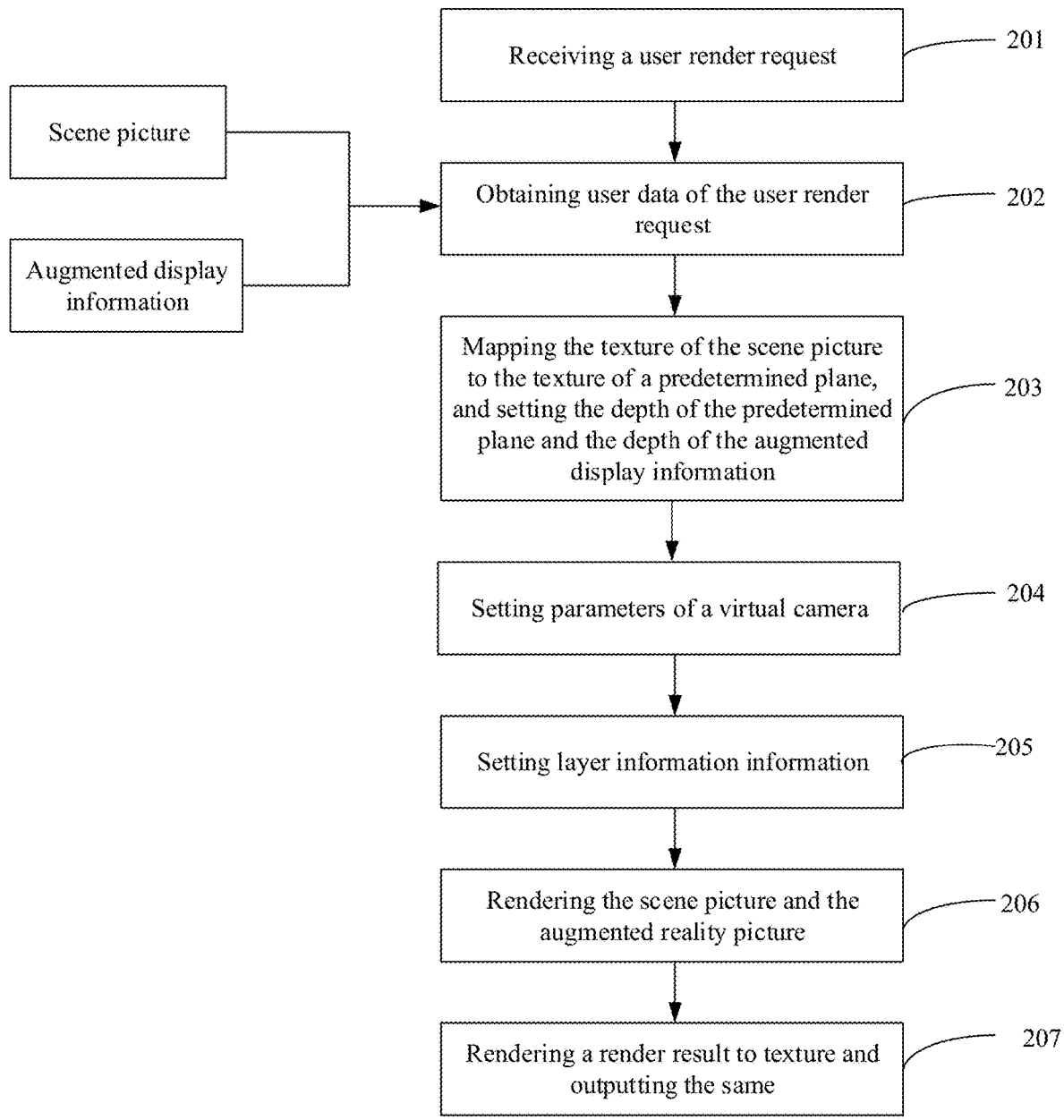
FIG. 5 is a flowchart of a method for processing display data provided by another embodiment of the present invention.

Specifically, referring to FIG. 5, the embodiment of the present invention provides another method for processing display data, including the following steps:

201. Receiving a user render request.

202. Obtaining user data of the user render request according to the received user render request.

The user data includes: a scene picture and an augmented reality picture.

203. Mapping the texture of the scene picture to the texture of a predetermined plane, and setting the depth of the predetermined plane and the depth of the augmented reality picture.

Specifically, the texture of the scene picture may be mapped to the texture of a rectangular plane, or a plane of other shapes. In the render process, the depth of the augmented reality picture is set to be less than the depth of the predetermined plane by the settings of the step 203, so that the augmented reality picture is presented in front of the scene picture, thereby realizing the effect that the augmented reality picture enhances the display of the scene picture. Further, in order to enable the scene picture and the augmented reality picture to be presented at a predetermined perspective, the method further includes a step 204.

204. Setting parameters of a virtual camera, so that the virtual camera renders the scene picture and the augmented reality picture at the predetermined perspective.

Exemplarily, the scene picture and the augmented reality picture may be presented in a first person perspective or a third person perspective by setting the parameters of the virtual camera.

205. Setting layer information of the virtual camera that performs image render on the user data in a render process, and layer information of the scene picture and the augmented reality picture in the render process, wherein the virtual camera and the scene picture and the augmented reality picture rendered by the virtual camera correspond to the same layer information in the render process.

206. Rendering the scene picture and the augmented reality picture by the virtual camera corresponding to the layer information in the render process according to different layer information.

The render of the user data in the step 206 specifically includes render for each frame of picture in the scene picture and the augmented reality picture.

207. Rendering a render result of each frame of picture in the user data to the texture and outputting the same.

The screen corresponding to one virtual camera output in the step 207 may be displayed in real time on the display device. In addition, when applied to a 3D or VR display scene, since images observed by the left and right eyes of an observer have a certain parallax, at this time, in the solution, the user data include first user data and second user data, wherein the first user data include a first scene picture and a first augmented reality picture; the second user data include a second scene picture and a second augmented reality picture; and a predetermined parallax is formed between the first scene picture and the second scene picture, and the predetermined parallax is formed between the first augmented reality picture and a second enhanced information. The first scene picture and the first augmented reality picture and their corresponding virtual camera are set as first layer information in the render process, and the second scene picture and the second augmented reality picture and their corresponding virtual cameras are set as second layer information.

Figure 6:
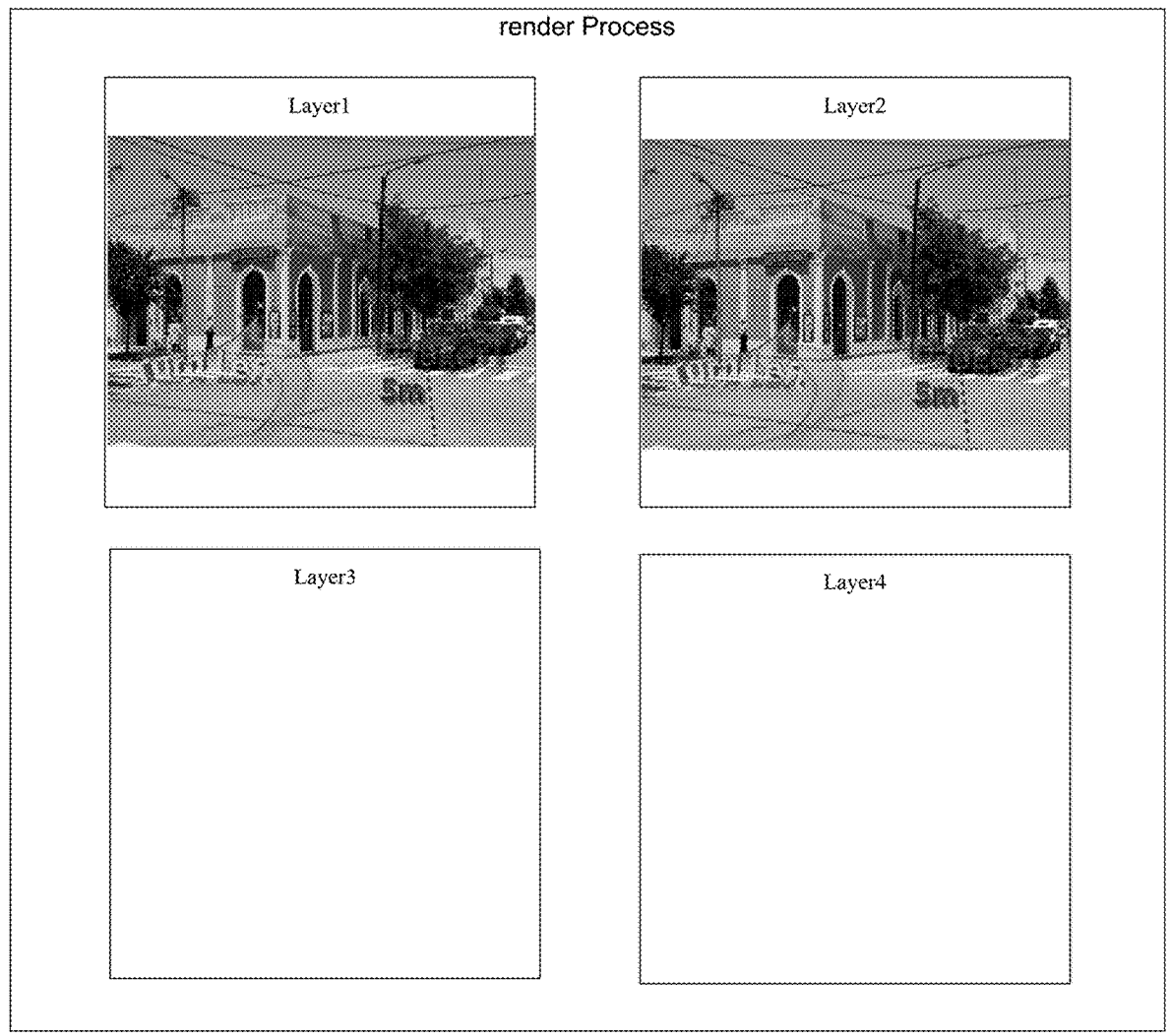
FIG. 6 is a schematic diagram of a render process in a method for processing display data provided by another embodiment of the present invention.

Of course, the 3D or VR display scene may be initiated by two user render requests, for example, the first user data are requested by the first user render request, and the first user data include the first scene picture and the first augmented reality picture; the second user data are requested by the second user render request, and the second user data include the second scene picture and the second augmented reality picture; the predetermined parallax is formed between the first scene picture and the second scene picture, and the predetermined parallax is formed between the first augmented reality picture and a second enhanced information. The first scene picture and the first augmented reality picture and their corresponding virtual camera are set as the first layer information in the render process, and the second scene picture and the second augmented reality picture and their corresponding virtual cameras are set as the second layer information. Exemplarily, as shown in FIG. 6, there is a certain parallax between the scene picture in the layer 1 and the scene picture in the Layer 2; and there is a certain parallax between the Turn Left, 5 m, Danger! and other augmented reality pictures in the layer 1 with the Turn Left, 5 m, Danger! and other augmented reality pictures in the Layer 2.

For the user data corresponding to different user render requests, when the user data corresponding to the different user render requests include the same scene image and/or augmented reality picture, the scene picture and/or the augmented reality picture may be multiplexed, that is, multiple pieces of layer information are set for the scene picture and/or the augmented reality picture, therefore, the workload of obtaining the repeated user data is reduced, and data transmission resources are saved.

It may be understood that the apparatus for processing display data implements the functions provided by the above embodiment through hardware structures and/or software modules contained therein. Those skilled in the art will readily appreciate that the present invention may be implemented by hardware or a combination of hardware and computer software in combination with the units and algorithm steps of the various examples described in the embodiments disclosed herein. Whether a certain function is implemented in the form of hardware or driving the hardware via the computer software is determined by specific applications and design constraint conditions of the technical solutions. Those skilled in the art may implement the described functions by using different methods for each specific application, but this implementation should not be considered beyond the scope of the present invention.

The embodiment of the present invention may divide the function modules of the apparatus for processing display data according to the above method example, for example, the function modules may be divided according to the functions, and two or more functions may also be integrated into one processing module. The above integrated module may be implemented in the form of hardware and may also be implemented in the form of a software function module. It should be noted that the division of the modules in the embodiment of the present invention is schematic and is only a logical function division, and other division manners may be provided during the actual implementation.

Figure 7:
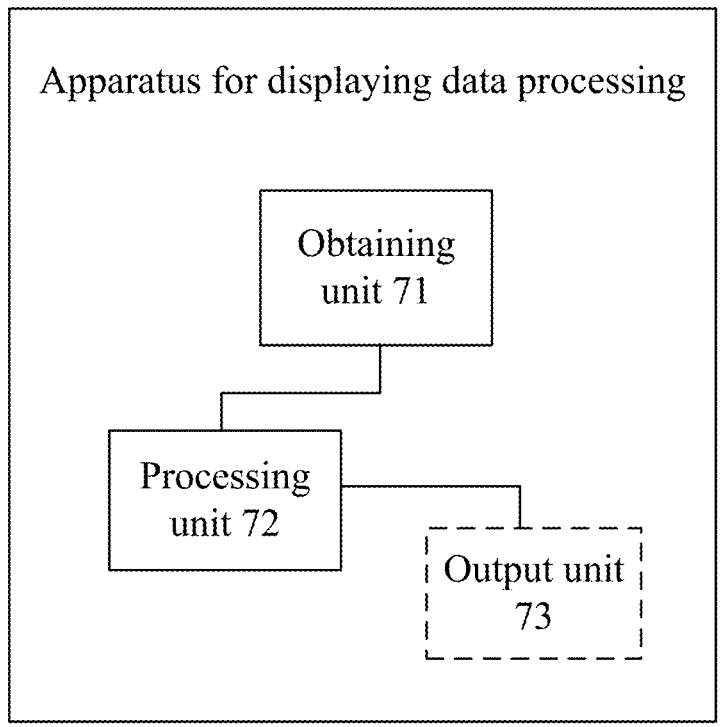
FIG. 7 is a structure diagram of an apparatus for processing display data provided by an embodiment of the present invention.

In the case that the function modules are divided according to the functions, FIG. 7 shows a possible structural schematic diagram of the apparatus for processing display data involved in the above embodiment, the apparatus for display data includes: an obtaining unit 71 and a processing unit 72. The obtaining unit 71 is configured to obtain user data of a user render request according to the received user render request, wherein the user data include: a scene picture and an augmented reality picture; and the processing unit 72 is configured to set layer information of a virtual camera that performs image render on the scene picture and the augmented reality picture in a render process, and layer information of the scene picture and the augmented reality picture in the render process, wherein the virtual camera and the scene picture and the augmented reality picture rendered by the virtual camera correspond to the same layer information in the render process; and the processing unit is further configured to render the scene picture and the augmented reality picture by the virtual camera corresponding to the layer information in the render process according to different layer information. Optionally, the processing unit 72 is further configured to map the texture of the scene picture to the texture of a predetermined plane, and set the depth of the predetermined plane and the depth of the augmented reality picture, wherein the depth of the augmented reality picture is less than the depth of the predetermined plane. The processing unit is further configured to set parameters of the virtual camera, so that the virtual camera renders the scene picture and the augmented reality picture at a predetermined perspective. The processing unit 72 is further configured to render a render result of each frame of picture in the user data to the texture and output the same through an output unit 73. All the related contents of the steps involved in the foregoing method embodiment may be quoted to the function descriptions of the corresponding function modules, and thus details are not described herein again.

Figure 8A:
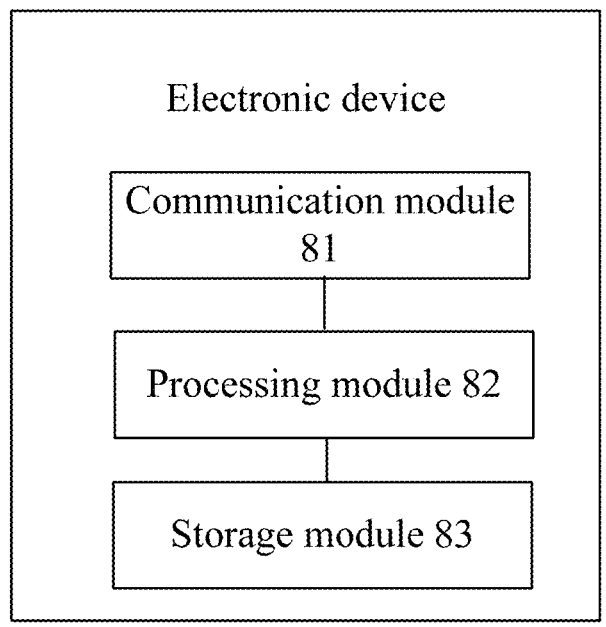
FIG. 8A is a structure diagram of an apparatus for processing display data provided by another embodiment of the present invention.

FIG. 8A is a possible structural schematic diagram of an electronic device involved in an embodiment of the present application. The electronic device includes a communication module 81 and a processing module 82. The processing module 82 is configured to perform control management on an action for processing display data. For example, the processing module 82 is configured to support the apparatus for processing display data to execute the method executed by the processing unit 72. The communication module 81 is configured to support the data transmission between the apparatus for processing display data and other devices, and to implement the method executed by the obtaining unit 71 and the output unit 73. The electronic device may also include a storage module 83, configured to store a program code and data of the apparatus for processing display data. For example, the method executed by the processing unit 72 is stored.

The processing module 82 may be a processor or a controller, for example, may be a central processing unit (CPU), a general purpose processor, a digital signal processor (DSP), an application-specific integrated circuit (ASIC), a field programmable gate array (FPGA) or other programmable logic devices, transistor logic devices, hardware components or any combinations thereof. The processing module may implement or execute logic boxes, modules and circuits of various examples described in combination with the contents disclosed by the present invention. The processor may also be a combination for implementing a computing function, for example, a combination including one or more microprocessors, a combination of a DSP and a microprocessor, and the like. The communication module 81 may be a transceiver, a transceiver circuit, a communication interface or the like. The storage module may be a memory.

Figure 8B:
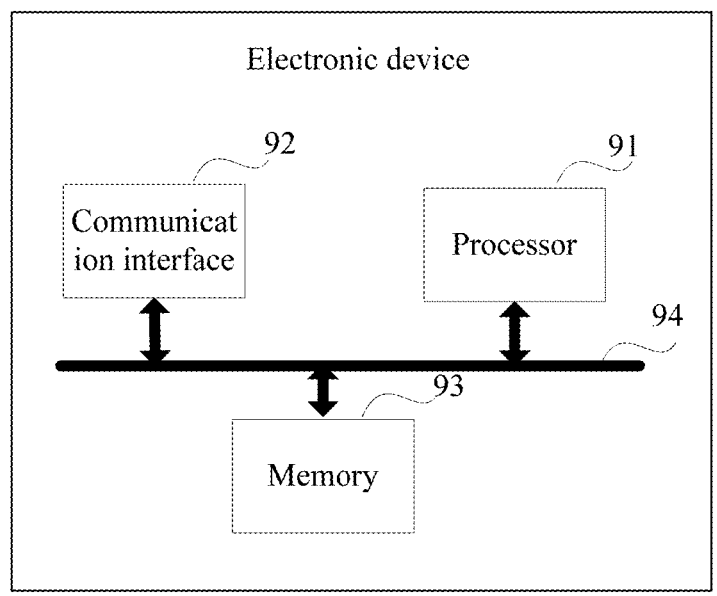
FIG. 8B is a structure diagram of an apparatus for processing display data provided by yet another embodiment of the present invention.

When the processing module 82 is the processor, the communication module 81 is the communication interface, and the storage module 83 is the memory, the electronic device involved in the embodiment of the present invention may be a render apparatus as shown in FIG. 8B.

Referring to FIG. 8B, the electronic device includes a processor 91, a communication interface 92 and a memory 93. The memory 93 and the communication interface 92 are coupled to the processor 91. For example, the communication interface 92, the processor 91 and the memory 93 are connected to each other by a bus 94; the memory 93 is configured to store a computer execution code, and the processor 91 is configured to execute the computer execution code to control to execute any one of the above methods for processing display data, and the communication interface 92 is configured to perform the data transmission between electronic device and the external device. The bus 94 may be a Peripheral Component Interconnect (PCI) bus or an Extended Industry Standard Architecture (EISA) bus or the like. The bus may be divided into an address bus, a data bus, a control bus and the like. For the ease of representation, the bus is only expressed by a thick line in FIG. 8B, but it does not mean that there is only one bus or one type of bus.

The steps of the method or algorithm described in combination with the contents disclosed by the present invention may be implemented in the form of hardware and may also be implemented by a processor executing software instructions. The software instructions may be composed of corresponding software modules, and the software modules may be stored in a Random Access Memory (RAM), a Read Only Memory (ROM), an Erasable Programmable ROM (EPROM), an Electrically EPROM (EEPROM), a register, a hard disk, a mobile hard disk, a CD-ROM or any other form of storage medium known in the art. An exemplary storage medium is coupled to the processor, so that the processor may read information from and write information to the storage medium. Of course, the storage medium may be a constituent part of the processor. The processor and the storage medium may be located in an ASIC. Additionally, the ASIC may be located in a core network interface device.

Of course, the processor and the storage medium may also exist as discrete components in a core network interface device.

Those skilled in the art should be aware that, in one or more examples described above, the functions described in the present invention may be implemented by hardware, software, firmware, or any combination thereof. When implemented by the software, these functions may be stored in a computer readable medium or transmitted as one or more instructions or codes on the computer readable medium. The computer readable medium includes a computer storage medium and a communication medium, wherein the communication medium includes any medium that may conveniently transfer the computer program from one place to another. The storage medium may be any available medium that may be accessed by a general purpose or special purpose computer.

The objectives, technical solutions and beneficial effects of the present invention have been further described in detail by the above specific embodiments, it should be understood that the foregoing descriptions are merely the specific embodiments of the present invention, rather than limiting the protection scope of the present invention, and any modifications, equivalent replacements, improvements and the like, made on the basis of the technical solutions of the present invention, should be included in the protection scope of the present invention.

The invention claimed is:

1. A method for processing display data, comprising:
   obtaining user data of a user render request according to the received user render request, wherein the user data comprise: a scene picture and an augmented reality picture;
   setting layer information of a virtual camera that performs image render on the scene picture and the augmented reality picture in a render process, and layer information of the scene picture and the augmented reality picture in the render process, wherein the virtual camera and the scene picture and the augmented reality picture rendered by the virtual camera correspond to the same layer information in the render process; and
   rendering the scene picture and the augmented reality picture by the virtual camera corresponding to the layer information in the render process according to the layer information, so as to process render tasks requested by multiple user render requests in the same render process; and
   wherein before setting the layer information of the virtual camera that performs image render on the scene picture and the augmented reality picture in the render process, and the layer information of the scene picture and the augmented reality picture in the render process, the method further comprises:
   mapping the texture of the scene picture to the texture of a predetermined plane, and setting the depth of the predetermined plane and the depth of the augmented reality picture, wherein the depth of the augmented reality picture is less than the depth of the predetermined plane.

2. The method according to claim 1, wherein the method further comprises:
   setting parameters of the virtual camera, so that the virtual camera renders the scene picture and the augmented reality picture at a predetermined perspective.

3. The method according to claim 1, wherein the method further comprises:

rendering the render result of each frame of picture in the user data to texture and outputting the same.

4. The method according to claim 1, wherein the user data comprise first user data and second user data, wherein the first user data comprise a first scene picture and a first augmented reality picture; the second user data comprise a second scene picture and a second augmented reality picture; and a predetermined parallax is formed between the first scene picture and the second scene picture, and the predetermined parallax is formed between the first augmented reality picture and a second enhanced information.

5. The method according to claim 1, wherein the augmented reality picture at least comprises one or more of a 3D model, animation and characters.

6. An electronic device, wherein comprising: a memory, a communication interface and a processor, wherein the memory and the communication interface are coupled to the processor; and the memory is configured to store a computer execution code, and the processor is configured to execute the computer execution code to control the execution of the method according to claim 1, and the communication interface is configured to perform data transmission between the apparatus for processing display data and an external device.

7. A non-transitory computer storage medium storing computer software executable by an apparatus for processing display data, and the computer software instruction, when executed, causes the apparatus to carry out the method for processing display data according to claim 1.

* * * * *